(12) United States Patent
Wang

(10) Patent No.: US 6,553,111 B1
(45) Date of Patent: Apr. 22, 2003

(54) SYNCHRONOUS DIGITAL HIERARCHY SWITCH SYSTEM

(75) Inventor: Chu Hong James Wang, Hong Kong (HK)

(73) Assignee: 3C Ltd., Kowloon (HK)

( * ) Notice: Subject to any disclaimer, the term of this patent is extended or adjusted under 35 U.S.C. 154(b) by 0 days.

(21) Appl. No.: 09/416,950

(22) Filed: Oct. 13, 1999

(51) Int. Cl.[7] .......................... H04M 7/00; H04L 12/28; H04L 12/56
(52) U.S. Cl. .................. 379/219; 379/221.01; 370/258; 370/403
(58) Field of Search ............................. 379/219, 220.01, 379/221.01, 229, 230, 93.01, 93.05, 399.01; 370/403, 404, 405, 424, 258

(56) References Cited

U.S. PATENT DOCUMENTS

| 5,421,025 A | 5/1995 | Yamada et al. | ............. 370/395 |
| 5,568,475 A | 10/1996 | Doshi et al. | ................ 370/399 |
| 5,651,003 A | 7/1997 | Pearce et al. | ................ 709/246 |

FOREIGN PATENT DOCUMENTS

| JP | 7058779 A | 3/1995 |
| JP | 8149137 A | 6/1996 |
| JP | 10098493 A | 4/1998 |
| JP | 10126448 A | 5/1998 |
| JP | 10276213 A | 10/1998 |

*Primary Examiner*—Benny Q. Tieu
(74) *Attorney, Agent, or Firm*—Burns, Doane, Swecker & Mathis, L.L.P.

(57) ABSTRACT

There is provided a digital switch system for connecting a telephone central office with a number of subscriber lines, in which the system includes at least one central office-digital trunk interface switch which allows digital signals to be transmitted between the switch system and the central office, and a number of subscriber line interface switches which allow signals to be transmitted between the switch system and the subscriber lines, in which each of the subscriber line interface switches is connected with at least one subscriber line via at least one digital-to-subscriber line converter, and in which the central office-digital trunk interface switch and the subscriber line interface switches are connected in a ring-shaped structure.

10 Claims, 4 Drawing Sheets

SYNCHRONOUS DIGITAL HIERARCHY SWITCH SYSTEM

This invention relates to a synchronous digital hierarchy switch system and, in particular, one that is suitable for use in the interface between a central office and end user(s) of a public service telephone network (PSTN).

BACKGROUND OF THE INVENTION

In a conventional switch system which connects the ultimate telephone apparatus to the PSTN central office, each individual switch is connected directly with the other switches constituting the switch system. The number of connections among the switches is thus determined by the following formula:

Number of Connection(s)=n x (n−1)/2 where n is the number of switches in the system. It is clearly the case that the larger the number of connections, the higher the probability of failure occurring therein.

In addition, in such conventional switching systems, the linked switches have to configure the path. Otherwise, distinct direct connections must be established. A separate control signal path must also exist.

It is thus an object of the present invention to provide a synchronous digital hierarchy switch system in which the aforesaid shortcomings are mitigated, or at least to provide a useful alternative to the public.

SUMMARY OF THE INVENTION

According to the present invention, there is provided a digital switch system for connecting a telephone central office with a plurality of telephone subscriber lines, wherein said system includes at least one central office-digital trunk interface switch member allowing signals to be transmitted between said switch system and said central office, and a plurality of subscriber line interface switch members allowing signals to be transmitted between said switch system and said subscriber lines, wherein each of said subscriber line interface switch members is connected with at least one subscriber line via at least one digital-to-subscriber line converting members, and wherein said central office-digital trunk interface switch member and said subscriber line interface switch members are connected in a ring-shaped structure.

BRIEF DESCRIPTION OF THE DRAWINGS

Embodiments of the present invention will now be described by way of examples, and with reference to the accompanying drawings, in which.

DETAILED DESCRIPTION OF THE PREFERRED EMBODIMENTS

The present invention seeks to perform the following two functions during high-speed transmission of digital data/signals a. reducing the speed of transmission of said digital data/signals, so as to allow said data/signals to be transmitted to the end user(s); and b. switching.

When digital data/signal streams are transmitted at a high rate (e.g. via a optical cable) into a switch system according to the present invention, the rate of transmission of the digital data/signals is directly reduced, and the desired portion is extracted for combination into low-speed digital data/signal streams, for onward transmission onto the end user(s) via other interface devices.

Figure 1:
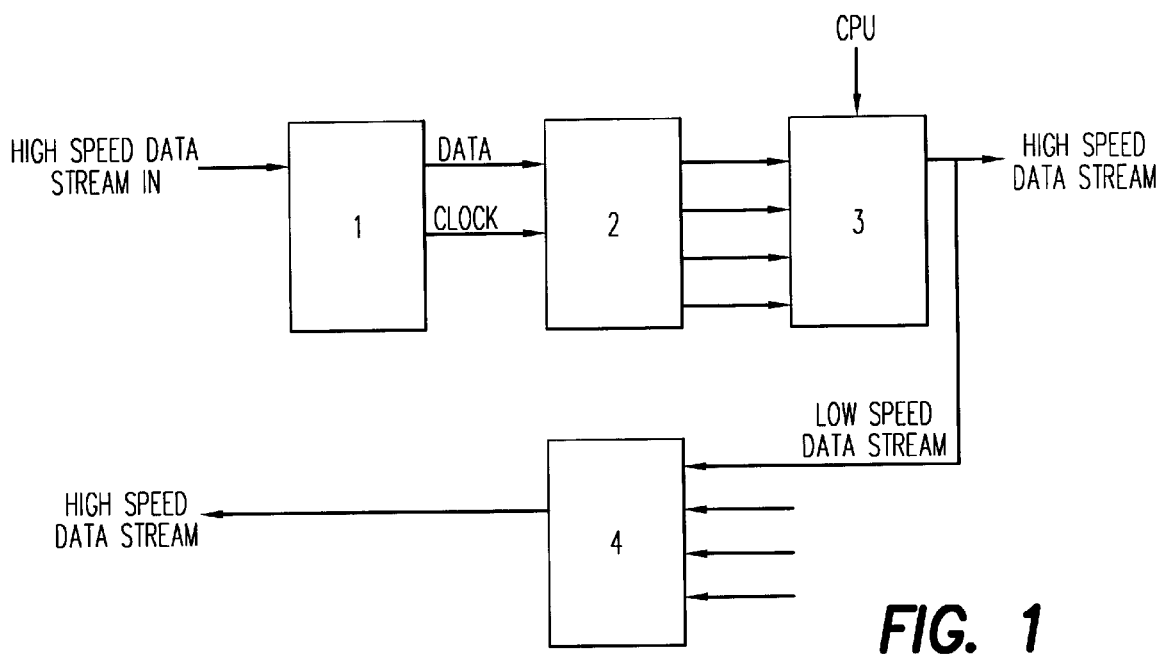
FIG. 1 is a schematic diagram illustrating the basic concept underlying the present invention.

As shown more clearly in FIG. 1, when a high-speed data stream (e.g. from a telephone central office, and at a rate of 65 Mbps) enters a switch system according to the present invention, the clock signals are isolated (Step 1) from the rest of the signals, e.g. data signals. The resultant high-speed data signals are then divided (Step 2) into a number of low-speed data signal streams (e.g. at a rate of 64 kbps). A central processing unit (CPU) controls the combination (Step 3) of the low-speed data signal streams to form one or more output data streams, which may be transmitted to the end user(s) via other interface devices. Low-speed data signal streams are combined (Step 4) to form a high-speed data stream for transmission to the telephone central office.

Figure 2:
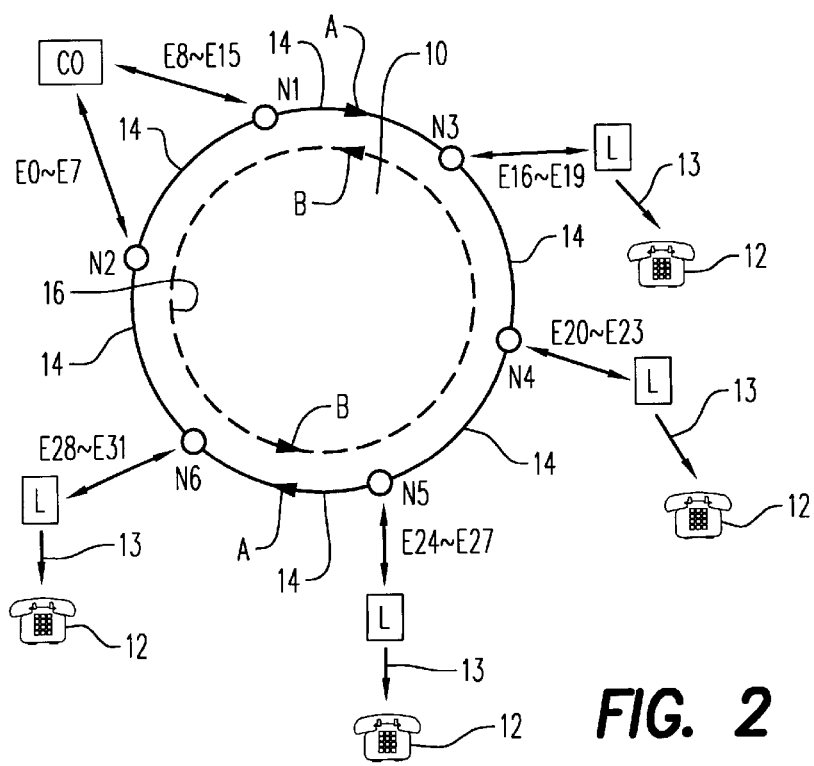
FIG. 2 is a schematic diagram showing a first embodiment of a switch system according to the present invention as connected to a central office and a number of telephone subscriber lines.

Turning to FIG. 2, such shows a first embodiment of a switch system (10) according to the present invention as connected to a central office (CO) and a number of telephones (12) via a number of subscriber lines (13). As can be seen, the switch system (10) includes a total of six nodes/switches (N1–N6). All such nodes/switches (N1–N6) contain pulse code modulation (PCM) switches, further details of which will be discussed below.

The nodes/switches (N1, N2) are host access nodes which act as central office-digital trunk interface switches, while the nodes/switches (N3–N6) are remote access nodes which act as subscriber line interface switches. The node/switch (N2) is connected with the central office (CO) via eight E1 links, namely E0–E7. Each E1 link allows digital signals/data to be transmitted at a rate of 2,048,000 bps (which is commonly called 2 Mbps), composed of thirty-two timeslots, each at a rate of 64,000 bps (which is commonly called 64 kbps). Similarly, the node/switch N1 is connected with the central office (CO) via eight E1 links, namely E8–E15.

The six nodes/switches (N1–N6) are connected with one another in the form of a ring-shaped structure via a number of optical links (e.g. optical fibres) (14). In normal operation, the digital data/signals are transmitted within the switch system (10) along the optical links in the direction indicated by the arrow A. In case of failure of any one of the nodes/switches (N1–N6), the remaining nodes/switches will automatically change to an alternative backup transmission line (16) in which the digital data/signals are transmitted in the direction indicated by the arrow B.

Each of the nodes (N3–N6) is connected with a number of end-user telephones (12) (of which only one is shown for each respective node N3–N6) via a number of subscriber line (13) (again, of which only one is shown for each respective node N3–N6). It can also be seen that each of the nodes (N3–N6) is connected with its respective end-user telephones via four E1 links. Take the node N3 as an example, the four E1 links are E16–E19. The signals transmitted through the links E16–E19 are formed into packets of low-speed data/signal streams, each to be transmitted at a rate of 64 kbps. Such low-speed data/signal streams are processed by a respective digital-to-subscriber line converter L before they are received by the end user telephone in the form of, e.g. audible sound. As can be seen in FIG. 2, there are altogether thirty-two E1 links, namely E0–E31, the total data/signal transmission rate is 65 Mbps.

In a digital switch system according to the present invention, the rate of data transmission within the switch system is constant. One switch (which can be any of the nodes/switches N1–N6) provides the system clock for all other switches. There is a very clear direction of transmission of the data. Each node/switch (N1–N6) is to receive data/signals from its preceding node/switch, and is to transmit data/signals to the succeeding node/switch. It can also be seen that, as compared with the conventional switch system described earlier, the number of connections among the switches is n, where n is the number of switches constituting the switch system. Such represents a significant decrease in the number of connections required in a conventional switch system.

Figure 3:
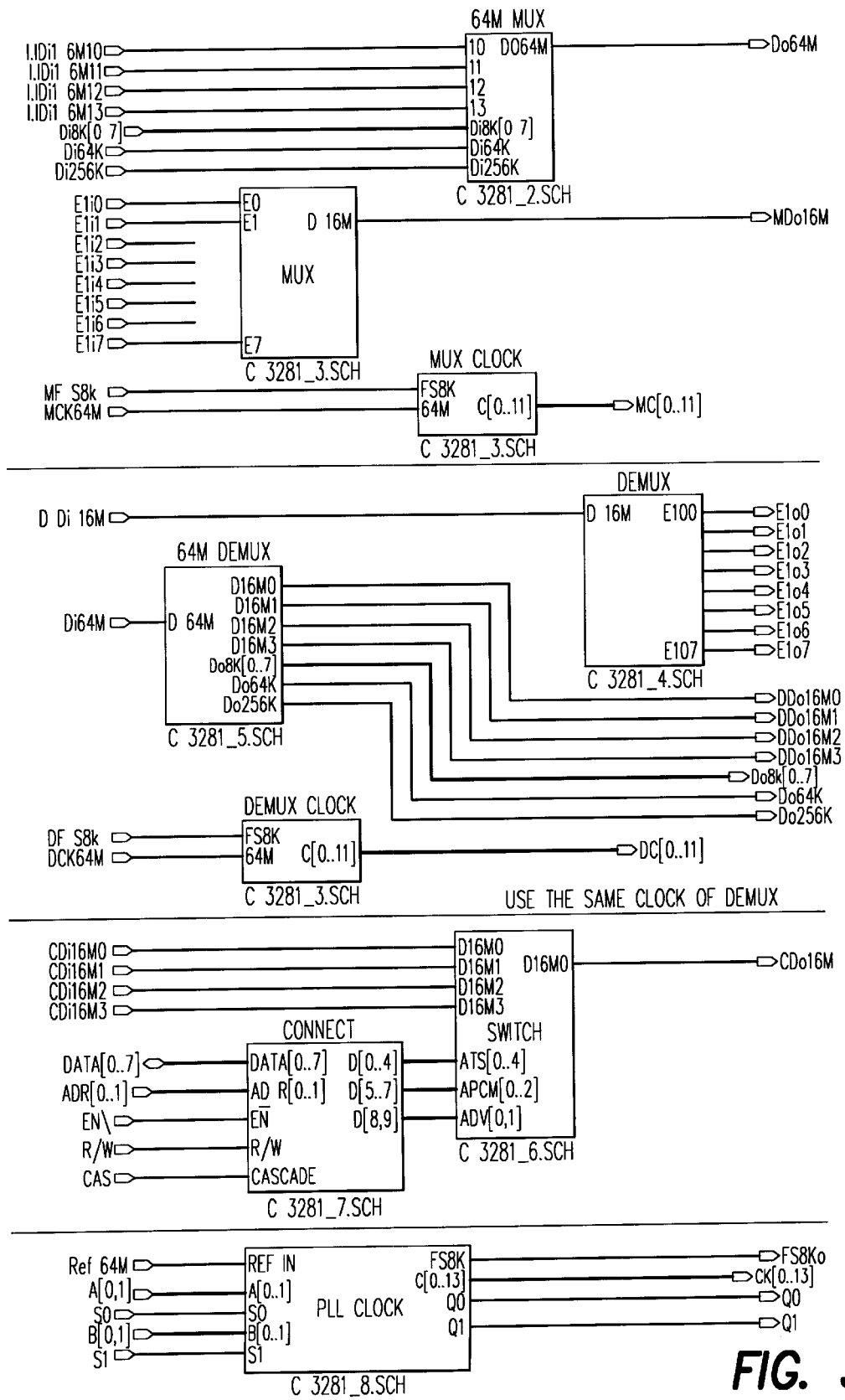
FIG. 3 shows a block diagram of a pulse code modulation (PCM) switch Application Specific Integrated Circuit (ASIC) which may be used in the present invention.

FIG. 3 shows a block diagram of a pulse code modulation (PCM) switch in the form of an Application Specific Integrated Circuit (ASIC) suitable for use in the present invention.

The ASIC has four PCM inputs, each of 16.384 Mbps, and one PCM output of 16.384 Mbps. For a one-layer switch network, one piece of the ASIC has 256 time slots (each of 64 kbps), and a maximum of four pieces of the ASICs provide 1,024 time slots (each of 64 kbps). For a two-layer switch network, eighty pieces of the ASICs provide a 4,096 time slot switch.

Each ASIC provides four function blocks, namely Multiplexor (MUX), Demultiplexer (DEMUX), Phase Locked Loop Clock Generator (PLL CLOCK), and Time Slot Add/Drop ports. Eight PCM switches, each of 2.048 Mbps, multiplex to one PCM switch of 16.384 Mbps, and then four PCM switches, each of 16.384 Mbps multiplex to one PCM switch of 65.536 Mbps. The Add/Drop time slot function is applied to the time slots of order $3^{rd}$ to $8^{th}$.

In the Multiplexer, eight inputs each of 2.048 Mbps are multiplexed to one output of 16.384 Mbps, and four inputs each of 16.384 Mpbs are multiplexed to one output of 65.536 Mpbs. Frame Sync Header A0 and A1 are inserted at the $1^{st}$ and $2^{nd}$ time slots of the 65.536 Mbps output, eight inputs of 8 kbps are inserted to the $3^{rd}$ time slot of the 65.536 Mbps output, one input of 64 kbps is inserted to the $4^{th}$ time slot of the 65.536 Mbps output, and one input of 256 bps is inserted to the $5^{th}$ to $8^{th}$ time slots of the 65.536 Mbps output.

In the Demultiplexor, one input of 65.536 Mbps is de-multiplexed to four outputs of 16.384 Mpbs each, and one input of 16.384 Mbps is demultiplexed to eight outputs of 2.048 Mpbs each. The Frame Sync Header A0 and A1 are searched for the starting frame position of the 65.536 Mbps input. Eight outputs of 8 kbps are extracted from the $3^{rd}$ time slot of the 65.536 Mbps input, one output of 64 kbps is extracted from the $4^{th}$ time slot of the 65.536 Mbps input, and one output of 256 kbps is extracted from the $5^{th}$ to $8^{th}$ time slots of the 65.536 Mbps input.

For the PCM switch, four inputs of 16.384 Mbps each are provided to the switch. One output of 16.384 Mbps is controlled from the switch. The switch also includes a 1024×8-bit of Speech RAM for the inputs, a 256×10-bit Control RAM for the output mapping, a 8-bit data bus interface for connection with the CPU, and four registers for control.

The Phase Locked Loop (PLL) Clock Generator is provided with a 65.536 MHz clock input. A 65.536 Mpbs Serial Link input searches for the Frame Sync Header A0 and A1. The PLL Clock Generator divides the clock outputs from 32.768 MHz to 8kHz to form an 8kHz Frame Sync Output. There is also provided a two-to-one failure recover circuit.

Figure 4:
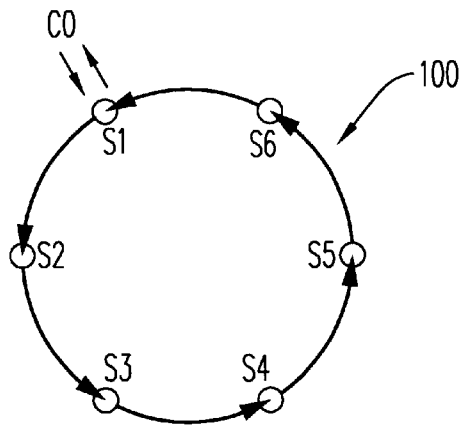
FIG. 4 shows schematically a second embodiment of a switch system according to the present invention.

As shown in FIG. 4, a second embodiment of a switch system according to the present invention is shown and generally designated as (100). While this switch system 100 also includes a total of six nodes/switches (S1–S6), only the node/switch S1 is connected with the central office (CO).

Figure 5:
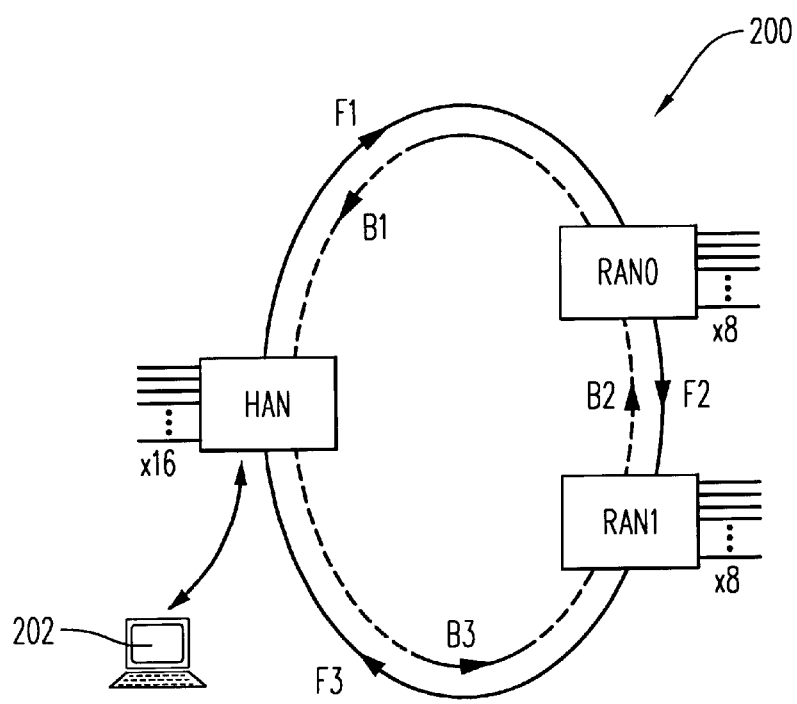
FIG. 5 shows schematically a third embodiment of a switch system according to the present invention.
Figure 6:
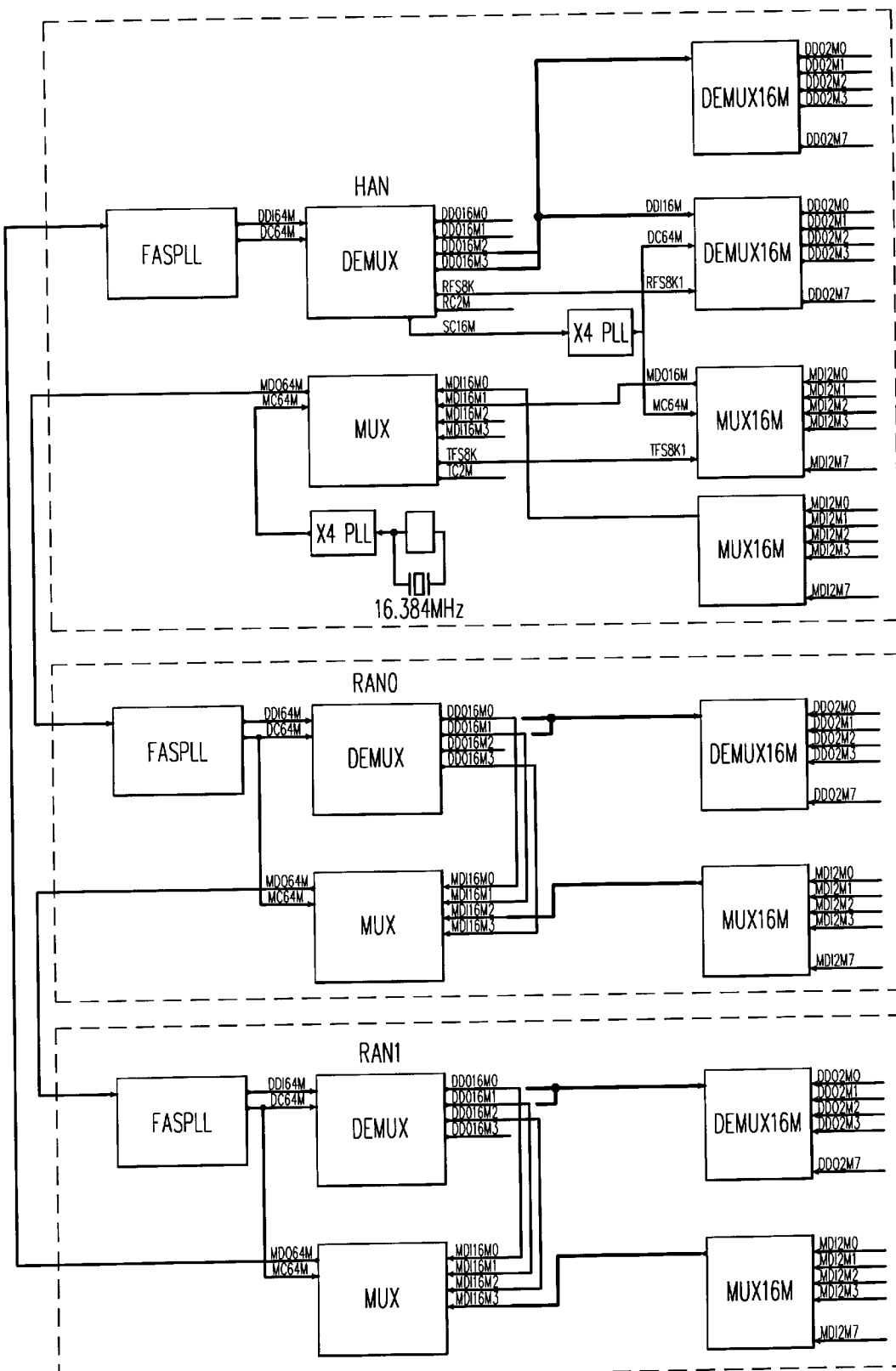
FIG. 6 shows in more detail the arrangement of the switch system shown in FIG. 5.

FIG. 5 shows a third embodiment of a switch system according to the present invention generally designated as (200), and FIG. 6 shows the arrangement of the switch system (200). In this system (200), only three nodes/switches (HAN, RAN0, RAN1) are provided, in which HAN acts as a host access node, and RAN0 and RAN1 act as remote access nodes. HAN has sixteen PCM Mode 31 E1 links and contains the command interface for connection with a processor, which may be a computer 202. Each of RAN0 and RAN1 has eight PCM Mode 31 E1 links. RAN0 and RAN1 have the same configuration, and they are both controlled by HAN. The entire structure constitutes an optimized synchronized digital hierarchy (OSDH) Ring. HAN, RAN0 and RAN1 are linked with by optical fibre cables F1, F2, F3, B1, B2 and B3, in which "F" stands for the forward transfer direction while "B" stands for the backward transfer direction. The numbers "1", "2" and "3" stand for the sequence of installation of the cables and their location in the network. Such an arrangement eases the installation and maintenance of the network. In essence, the OSDH Ring is a duplex optical link connecting the HAN, RAN0 and RAN1. There are a total of thirty-two PCM Mode 31 E1 links and the manner of operation is sixteen to sixteen. The optical characteristics are: single mode, 1300 nm, FC/PC connector/optical cable plug, and each optical link segment is of 15 km. The data are channelized at 64 kbps-multiple. A total of 512×512 connections can be set up.

The processor (e.g. the computer 202 in the present example) includes a 16 MHz, 8 bit central processing unit (CPU), and the following memories: (a) 64 k byte EPROM for programming, (b) 32 k RAM for data, and (c) 64 k bit EEPROM for parameter. As for clock signals, there is provided a 16.384 MHz master clock with +/−1 ppm. For command links, such are set at a rate of 2,400 bps, no parity and 1 stop bit, the command being in ASCII format. In particular, connection is set up by the a RS232 command ports at the HAN. The RS232 command port is at a data transmission rate of 2,400 bps and all the command syntax is in letter form.

What is claimed is:

1. A digital switch system for connecting a telephone central office with a plurality of subscriber lines, wherein said system includes at least one central office-digital trunk interface switch member allowing signals to be transmitted between said switch system and said central office, and a plurality of subscriber line interface switch members allowing signals to be transmitted between said switch system and said subscriber lines, wherein each of said subscriber line interface switch members is connected with at least one subscriber line via at least one digital-to-subscriber line converting member, and wherein said central office-digital trunk interface switch member and said subscriber line interface switch members are connected in a ring-shaped structure.

2. A switch system according to claim 1 wherein said central office-digital trunk interface switch member comprises a host access node.

3. A switch system according to claim 1 wherein said subscriber line interface switch member comprises a remote access node.

4. A switch system according to claim 1 wherein the signals are transmissible within said system at a higher rate than the rate of transmission of signals between said subscriber line interface switch member and the subscriber line(s) with which said subscriber line interface switch member is connected.

5. A switch system according to claim 4 wherein said signals are transmissible within said switch system at a rate of substantially 65 Mbps.

6. A switch system according to claim 4 wherein said signals are transmissible between said subscriber line interface switch member and said subscriber line(s) at a rate of substantially 64 kbps.

7. A switch system according to claim 1 wherein said switch system includes two central office-digital trunk interface switch members.

8. A switch system according to claim 1 wherein the direction of transmission of said signals within said switch system is adapted to be changed.

9. A switch system according to claim 8 wherein the direction of transmission of said signals within said switch system is changed when at least the or one of said central office-digital trunk interface switch member or at least one of said subscriber line interface switch members fails to function.

10. A switch system according to claim 1, wherein at least one of said subscriber line interface switch members is PCM switch.

* * * * *